May 25, 1943.                    H. T. SEELEY                    2,320,198
                           SYNCHRONIZING INDICATOR
                              Filed May 2, 1942

Inventor:
Harold T. Seeley,
by Harry E. Dunham
His Attorney.

Patented May 25, 1943

2,320,198

UNITED STATES PATENT OFFICE 2,320,198

SYNCHRONIZING INDICATOR

Harold T. Seeley, Lansdowne, Pa., assignor to General Electric Company, a corporation of New York Application May 2, 1942, Serial No. 441,420

3 Claims. (Cl. 172—245)

My invention relates to means for indicating the difference in phase angle and the magnitude and direction of frequency difference between two three-phase power systems for the purpose of advising an operator when he may safely close a synchronizing switch between such systems. My invention also relates to such indicating apparatus of a character by means of which the indication may be had at a remote point with the employment of only two pilot wires or connections. The invention is particularly useful for indicating at a remote point when a synchonizing switch in an unattended power station may be safely closed and indicating the direction and extent of change in the frequency or phase angle to arrive at such condition.

Figure 1:
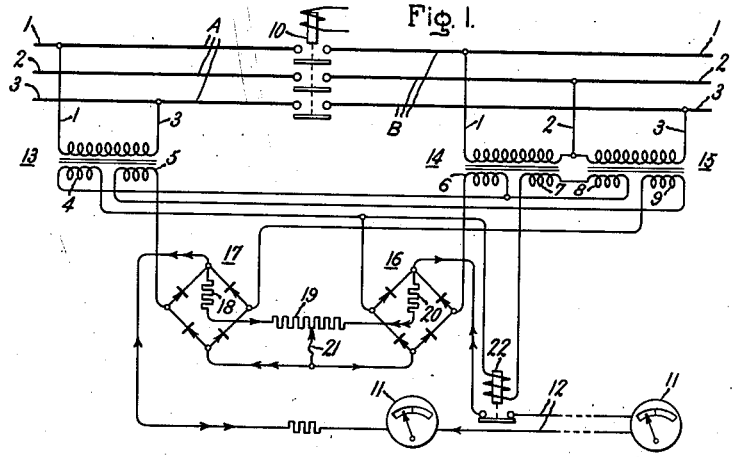
Figure 2:
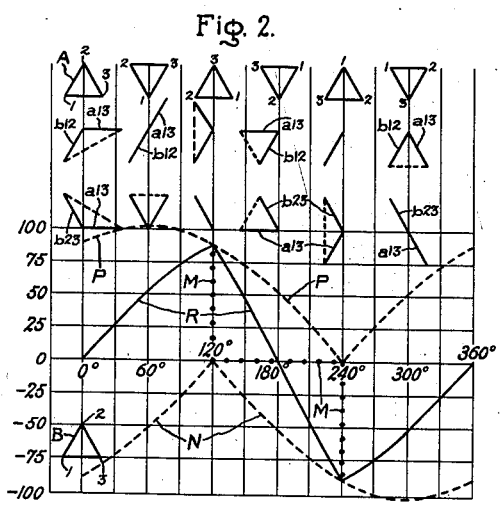
Figure 3:
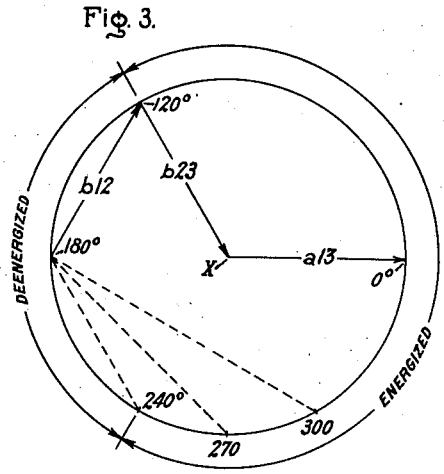

The features of my invention which are believed to be novel and patentable will be pointed out in the claims appended hereto. For a better understanding of my invention, reference is made in the following description to the accompanying drawing in which Fig. 1 shows the preferred circuit connections; Fig. 2 represents vector relations and combinations of the voltages for energizing the instrument; and Fig. 3 vector relations for the voltages for energizing a relay employed to deenergize the instrument under certain conditions.

Referring to Fig. 1, A and B represent two three-phase power systems which are to be connected together by a switch indicated at 10, which switch may be remotely controlled. The invention relates to means by which an indication is obtained on a single instrument 11 which may be in the same station or at a remote station, or there may be similar instruments at both stations for advising an operator of the phase angle relation between the two systems and the difference and direction of small differences in frequency, if any, between such systems. Two instruments 11 are shown connected in series, the one to the right being assumed to be located at a remote point and energized over a pair of pilot wires 12 in order that an operator at such remote point may synchronize the two systems and close the switch 10 by remote control. The instruments 11 are preferably of the direct current zero center type and are energized through rectifiers and potential transformers from the two systems A and B in a manner now to be described.

For convenience the different phases of the power systems are designated 1, 2 and 3. A potential transformer 13 is connected across phases 1—3 of power system A. This transformer has two similar secondary windings 4 and 5 and produces equal voltages which I will designate $a13$ to correspond to phases 1 and 3 of power system A. A potential transformer 14 is connected across phases 1—2 of system B and has similar secondary windings 6 and 7, the voltage of which will be designated $b12$. A potential transformer 15 is also connected across phases 2—3 of system B and has similar secondary windings 8 and 9, the voltage of which I will designate $b13$. When the A and B system voltages are equal, it will be assumed that the voltages $a13$, $b12$ and $b23$ will be equal.

Connections are provided by means of which the $a13$ voltage of secondary winding 4 and the $b12$ voltage of secondary winding 6 are combined to feed the full wave rectifier 16. A portion of the current due to such rectification may flow out from the top or positive terminal of the rectifier and through the instrument circuit as indicated by the single-headed arrow and return to the bottom or negative terminal of rectifier 16 through resistances 18 and 19 and adjustable potentiometer connection 21. It will be assumed that when such current flows out from rectifier 16 it produces a positive indication of the instruments 11. The $a13$ voltage of secondary winding 5 is combined with the $b23$ voltage of secondary winding 9 to feed full wave rectifier bridge 17 and, in case rectifier 17 happens to predominate over rectifier 16, a portion of the current from rectifier 17 flows through the instrument circuit as represented by the double-headed arrows and causes a negative deflection of the instruments, the current returning to the bottom terminal of rectifier 17 through resistances 20 and 19 and connection 21. It is evident that some of the current from a rectifier will not pass through the instrument circuit since the instrument is connected across resistance connections 18—19—20 between the positive rectifier terminals. The negative rectifier terminals are also connected together. For example, a portion of the current from rectifier 17 will pass from top to bottom terminals through resistances 18, 19 and connection 21. However, bypass resistances 18 and 20 are necessary in order to provide a return path for the instrument current.

The particular rectifier which will predominate to energize the instrument circuit and determine the direction of the instrument indication from zero will depend upon the particular phase angular relation of the transformer voltages feeding the rectifiers. This is explained by the curves of Fig. 2.

In Fig. 2 the abscissa represents angular phase difference between the A and B power systems or, more specifically, the degrees lead of system A with respect to system B starting with zero phase difference at the left and continuing to the right through a 360-degree range or cycle of such phase difference. The A and B triangles shown in vertical line with the zero phase difference point represent the in-phase relation of the three phase A and B voltage vectors. Since the B voltage is taken as a reference, its triangular representation is assumed to be fixed and is not repeated. However, the upper line of triangles from left to right represent the A voltage as being rotated counter-clockwise through successive 60-degree angles, the positions and orientations of the successive triangles corresponding to the phase difference as indicated on the abscissa scale. The next lower row of vectors shows the combination of the $a13$ voltages with $b12$ voltages of secondary windings 4 and 6 which feed the positive indicating rectifier 16. Thus at 0 phase difference of the A and B voltages the vectors $a13$ and $b12$ are in the same directions as the vector sides 1—2 and 1—3 of the A and B triangles. The dotted line drawn between the terminals of the vectors represents the resultant voltage applied to rectifier 16 for this particular phase relation. I call this the positive resultant. At 60 degrees displacement vector $a13$ has rotated in line with vector $b12$, and the resultant is correspondingly greater. At 240 degrees the vectors cancel. The third row of vectors shows the manner in which the $a13$ and $b23$ secondary voltages of windings 5 and 9 combine to feed the negative indicating rectifier 17 for the different angles of lead. At 120 degrees the resultant is zero, and at 300 degrees the resultant is a maximum. I call this resultant the negative resultant. If now we should plot the various positive resultants, we would obtain a curve such as dotted line curve P which corresponds to the voltage applied across rectifier 16 for various phase angles between the A and B voltages. Thus at 60 degrees P is a maximum, and at 240 degrees it is zero. Likewise, if we plotted the different negative resultant voltages or the vector sum of the $a13$ and $b23$ voltages as applied to rectifier 17, we would obtain the dotted line curve N. The negative resultants are plotted below and the positive resultants above the zero voltage line because they are opposed to each other in the instrument circuit. Thus at 120 degrees N is zero and at 300 degrees its negative value is a maximum. The ordinates for these curves represent voltage and are so marked in percent. The full line curve R represents the algebraic sum of curves P and N and corresponds to the resultant voltage applied to the instrument circuit from both rectifiers. It is seen that at zero and 180 degrees phase difference the instruments 11 will read zero. For an angle of lead of phase A with respect to phase B between zero and 180 degrees the instrument will read positive and for lead angles between 180 and 360 degrees the instrument will read negative.

While such instrument information is helpful, it is insufficient. For example, a zero reading does not tell whether the systems are in phase or 180 degrees out of phase. Also, if the reading be 25 per cent positive, the operator does not know if phase A is 30 or 162 degrees ahead of B. In the intended use as a synchronizing device the difference in frequency between systems A and B will be small and, as the phase relations change, the instrument will deflect first positive and then negative. The rate at which the pointer swings back and forth will be an indication of the difference in frequency between the systems. It will not, however, indicate which frequency is the higher. As zero frequency difference is approached and the pointer moves more slowly and finally stops at a given indication, which may be zero, positive or negative when the frequency difference becomes zero, the operator cannot be sure what the phase relation is from such indication and an important aspect of my invention is to modify the character of the indication given by such an instrument in order that the direction of frequency difference and phase relation will be known.

To this end I provide a relay which serves to deenergize the instrument for phase angular relations between about 120 degrees and 240 degrees on the scale of Fig. 2. Thus considering the curve R represents plus and minus instrument reading as well as plus and minus voltage, I modify such curve between 120 and 240 degrees as indicated by the dotted line M. Now when synchronism is approached, the instrument pointer will behave very much differently between 120 and 240 degrees, as compared to its behavior over the remaining part of the cycle of change and the operator can readily distinguish between a slow, steady movement of the pointer through zero when passing through synchronism and a sudden drop to zero, a definite pause on zero and then a sudden deflection while passing through the 120 to 240 degree out-of-phase portion of the cycle. Also now, if the pointer stops on, say, the 25% plus voltage indication, the operator knows definitely that system A is leading by 30 degrees and not 162 degrees. He knows which way and by how much the phase relation needs to be changed to bring about a paralleling condition and when such condition is reached, it is distinguished from the 180 degree out-of-phase condition by the definitely different manner of approach of the pointer of the instrument to a zero center position. The damping of the instrument is such as to make this difference stand out. Also now the direction of the slow motion of the pointer through zero indicates which system frequency is the higher.

One relay arrangement which can be used for deenergizing the instrument circuit over the 120 to 240 out-of-phase portion of the phase relation cycle is shown in Fig. 1. 22 represents a relay controlling a switch in the instrument circuit. In the example given, the coil of the relay is energized in accordance with the vector sum of the $b12$ voltage of transformer winding 7, the $b23$ voltage of transformer winding 8 and the $a13$ voltage of transformer winding 4. When the A and B systems are in phase relay 22 receives maximum current and when 180 degrees out of phase, it receives zero energizing current. The vector relation for different out-of-phase conditions of these voltages may be seen from Fig. 3. The vectors $b12$, $b23$ and $a13$ are shown for the in-phase condition of systems A and B. In this condition, the voltage across the relay is a maximum and is equal to the diameter of the inner circle which is the vector sum of the three voltage vectors under this condition. As the phase relation changes through a phase-changing cycle of 360 degrees, vector $a13$ rotates about point X. At 120 degrees it is in line with and cancels voltage b23 so that the voltage across the relay is reduced to the voltage b12.

At 180 degrees it closes the vector triangle and the relay voltage becomes zero. From 180 degrees through 240 degrees back to 0 degree the relay voltage increases and at any point is equal to the distance from the inner circle at such point to the point marked 180 degrees. Dotted lines indicate the value of the relay voltages at 240, 270 and 300 degrees. It is now seen that as thus connected the relay can be readily designed to pull up its armature and close the relay circuit over about the 240—0—120 degree range and to drop out and open this circuit through the 120—180—240 degree range. Such two ranges are indicated and marked "energized" and "deenergized" on Fig. 3. The exact point on such circle where the relay will pull in and drop out is not critical although it should be as near to the points indicated as is feasible for best results.

It is not important that the relay be designed to function as described when there is a considerable difference in frequency of the power systems because the operator can tell by the nature of the fluctuation of the instrument pointer and by a knowledge of other conditions if such considerable difference in frequency exists and does not attempt to synchronize under such conditions. The relay contacts may be placed anywhere in the circuit or circuits which energize the instrument as, for example, in the connection 21 or the a—c leads to the rectifiers. It will be noted that the lead 21 is adjustable along the resistance 19. This calibration adjustment is desirable as a means of setting the instrument pointer on zero for zero angle where, for example, the internal resistances of the rectifiers or rectifier circuits do not exactly balance.

It will be evident that this single instrument, when used as intended, gives the operator reliable information as to the direction and magnitude of phase difference. It distinguishes between the approach to zero and 180 degree phase differences. It also gives an indication of frequency difference and as to which system has the lower frequency. For instance, the pointer moves gradually through zero from left to right but by jerks in the opposite direction when one system has the higher frequency and this behavior is reversed if the other system has the higher frequency. The operator therefore has accurate knowledge as to when to close the switch 10, and also which system frequency should be raised or lowered in order to arrive at the synchronizing condition.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Apparatus for indicating the phase relationship between two three-phase alternating current systems comprising means for rectifying the vector sum of the voltages from one pair of different phases of the two systems, other means for rectifying the vector sum of the voltages from another pair of different phases of the two systems, a zero center direct current measuring instrument differentially connected to the two rectifier means for indicating the direction and magnitude of the difference, if any, in said rectified voltages and a phase responsive relay energized jointly from both systems for deenergizing said instrument when the phase relation between said systems is between about 120 and 240 degrees out of phase.

2. Apparatus for indicating the phase relationship between two three-phase alternating current systems comprising transformer means for deriving a first voltage from one phase of one system, transformer means for deriving second and third voltages from the other two phases of the other system, connections and rectifier means for rectifying the vector sum of the first and second derived voltages, connections and rectifier means for rectifying the vector sum of the first and third derived voltages, a zero center direct current instrument connected to said rectifier means for producing an indication indicative of the direction and magnitude of the difference, if any, between the rectified currents, and relay means connected to be energized from said transformer means in accordance with the vector sum of all of the derived voltages for deenergization of said instrument when the two systems differ from an in-phase relation by more than about 120 degrees.

3. Apparatus responsive to the phase relation between two three-phase systems comprising means for deriving a first voltage from one phase of one system, means for deriving proportional second and third voltages from the other two phases of the other system, a rectified energized by the vector sum of the first and second voltages, a rectifier energized by the vector sum of the first and third voltages, a connection between the positive output terminals of said rectifiers, a connection between the negative output terminals of said rectifiers one of said connections including resistance, a potentiometer connection between said two connections and a zero center direct current instrument connected across said resistance.

HAROLD T. SEELEY.